(12) United States Patent
Sone et al.

(10) Patent No.: US 11,878,640 B2
(45) Date of Patent: Jan. 23, 2024

(54) WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kosuke Sone, Mie (JP); Hiroki Hirai, Mie (JP); Yasuyuki Yamamoto, Mie (JP); Kazuyoshi Ohara, Mie (JP); Norichika Oomi, Mie (JP); Daisuke Miyawaki, Mie (JP); Shinichi Ishiko, Mie (JP); Yuji Takenaka, Mie (JP); Ichiro Kuwayama, Osaka (JP); Suguru Yamagishi, Osaka (JP); Toyohisa Takano, Osaka (JP); Yutaro Miki, Osaka (JP); Takanori Fukunaga, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 171 days.

(21) Appl. No.: 17/441,505

(22) PCT Filed: Mar. 27, 2020

(86) PCT No.: PCT/JP2020/013946
§ 371 (c)(1),
(2) Date: Sep. 21, 2021

(87) PCT Pub. No.: WO2020/203738
PCT Pub. Date: Oct. 8, 2020

(65) Prior Publication Data
US 2022/0176898 A1 Jun. 9, 2022

(30) Foreign Application Priority Data

Mar. 29, 2019 (JP) ................................. 2019-068199

(51) Int. Cl.
*B60R 16/02* (2006.01)
(52) U.S. Cl.
CPC ............................ *B60R 16/0207* (2013.01)
(58) Field of Classification Search
None
See application file for complete search history.

(56) References Cited

U.S. PATENT DOCUMENTS 5,442,519 A * 8/1995 DeBalko ................. H04M 3/18
361/791
5,613,857 A * 3/1997 Kawamura ......... B60R 16/0207
439/519

(Continued)

FOREIGN PATENT DOCUMENTS

CN 104425909 A * 3/2015 ........... H01R 12/526
CN 206589877 U * 10/2017

(Continued)

OTHER PUBLICATIONS

International Search Report issued in International Pat. Appl. No. PCT/JP2020/013946, dated Jun. 16, 2020, along with an English translation thereof.

(Continued)

*Primary Examiner* — Timothy J. Dole
*Assistant Examiner* — Muhammed Azam
(74) *Attorney, Agent, or Firm* — Greenblum & Bernstein, P.L.C.

(57) ABSTRACT

A wiring module includes: a sheet which is a member extending planarly and including an easy-fracture part sectioning the sheet into a plurality of areas and capable of dividing the sheet into the areas; and a transmission member (Continued)

including one of or both a power line supplying an electrical power to at least one apparatus provided in one or more of the plurality of areas and a signal line enabling communication with the apparatus, wherein, in a case where the transmission member is disposed over at least two areas, a part of a middle portion of the transmission member in relation to an end portion connected to the apparatus is fixed to a first area in the two areas, and the transmission member is laid without being fixed to a second area in the two areas.

8 Claims, 7 Drawing Sheets

(56) References Cited

U.S. PATENT DOCUMENTS

| | | | | |
|---|---|---|---|---|
| 5,652,462 | A * | 7/1997 | Matsunaga | H01L 25/0657 257/E23.079 |
| 6,308,944 | B1 * | 10/2001 | Ota | B60R 16/0207 269/903 |
| 9,481,327 | B2 * | 11/2016 | Shibata | H02G 3/083 |
| 2002/0043031 | A1 * | 4/2002 | Eguchi | H02S 20/23 52/173.3 |
| 2004/0016565 | A1 * | 1/2004 | Gallant | H05K 3/0058 174/117 F |
| 2004/0102079 | A1 * | 5/2004 | Hayes | H01R 12/68 439/404 |
| 2004/0183375 | A1 * | 9/2004 | Hayes | B60R 16/0207 307/10.1 |
| 2010/0218976 | A1 * | 9/2010 | Suzuki | B60R 16/0215 29/407.01 |
| 2011/0031809 | A1 * | 2/2011 | Yoshida | H02G 3/0462 29/854 |
| 2019/0139675 | A1 * | 5/2019 | Mizuno | H01B 7/0045 |
| 2022/0158335 | A1 * | 5/2022 | Sone | B60R 11/0205 |
| 2022/0158336 | A1 * | 5/2022 | Sone | H01Q 1/40 |
| 2022/0181770 | A1 * | 6/2022 | Sone | H01Q 1/22 |

FOREIGN PATENT DOCUMENTS

| | | | | |
|---|---|---|---|---|
| CN | 107112086 B | * | 6/2019 | B60R 16/0207 |
| CN | 111740376 A | * | 10/2020 | B60R 16/0215 |
| CN | 113632182 A | * | 11/2021 | B60R 16/0207 |
| CN | 115116672 A | * | 9/2022 | B60R 16/0215 |
| CN | 115461247 A | * | 12/2022 | B60R 16/02 |
| DE | 4128060 A1 | * | 2/1992 | |
| DE | 102012006835 A1 | * | 1/2013 | H02G 3/30 |
| DE | 102012203727 A1 | * | 9/2013 | B60R 16/0215 |
| EP | 0083406 A2 | * | 7/1983 | |
| FR | 2807380 A1 | * | 10/2001 | B60R 16/0207 |
| JP | S6423069 U | * | 2/1989 | |
| JP | H07147719 A | * | 6/1995 | |
| JP | H07120647 B2 | * | 12/1995 | |
| JP | S636874 U | * | 1/1998 | |
| JP | 10076888 A | * | 3/1998 | |
| JP | H1076888 A | * | 3/1998 | |
| JP | H10208791 A | * | 8/1998 | |
| JP | 2946914 B2 | * | 9/1999 | |
| JP | 2000174318 A | * | 6/2000 | |
| JP | 2004-074954 | | 3/2004 | |
| JP | 4096988 B1 | * | 6/2008 | G02B 6/43 |
| JP | 2013-127866 | | 6/2013 | |
| JP | 2015076919 A | * | 4/2015 | |
| JP | 6197555 B2 | * | 9/2017 | |
| JP | 2018-090229 | | 6/2018 | |
| JP | 2018137208 A | * | 8/2018 | B60R 16/02 |
| JP | 2018-207625 | | 12/2018 | |
| JP | 2018207625 A | * | 12/2018 | |
| JP | 6502576 B1 | * | 4/2019 | H01L 25/07 |
| JP | WO2019093264 A1 | * | 4/2020 | |
| JP | 2020188681 A | * | 11/2020 | |
| JP | 2021150233 A | * | 9/2021 | B60R 16/0215 |
| JP | 2022036102 A | * | 3/2022 | |
| RU | 2376167 C1 | | 12/2009 | |
| WO | WO-2013001667 A1 | * | 1/2013 | B60R 16/0215 |
| WO | WO-2014136565 A1 | * | 9/2014 | B60R 16/0207 |
| WO | WO-2014175048 A1 | * | 10/2014 | B60R 16/0215 |
| WO | WO-2016080522 A1 | * | 5/2016 | H01B 5/02 |
| WO | WO-2017104502 A1 | * | 6/2017 | H01B 7/00 |
| WO | WO-2017183520 A1 | * | 10/2017 | H01B 7/0045 |
| WO | WO-2017188148 A1 | * | 11/2017 | B60R 16/0215 |
| WO | WO-2018088183 A1 | * | 5/2018 | B60R 16/0215 |
| WO | WO-2018088190 A1 | * | 5/2018 | B60R 13/08 |
| WO | WO-2018155166 A1 | * | 8/2018 | B60R 16/02 |
| WO | WO-2018207695 A1 | * | 11/2018 | B60R 16/0215 |
| WO | WO-2018221182 A1 | * | 12/2018 | H01B 13/0129 |
| WO | WO-2018229918 A1 | * | 12/2018 | B60R 16/0207 |
| WO | WO-2019039073 A1 | * | 2/2019 | B60R 16/0207 |
| WO | WO-2019130897 A1 | * | 7/2019 | B60R 16/0207 |
| WO | WO-2019155705 A1 | * | 8/2019 | |
| WO | WO-2019159392 A1 | * | 8/2019 | |
| WO | WO-2019159393 A1 | * | 8/2019 | |
| WO | WO-2019160147 A1 | * | 8/2019 | |
| WO | WO-2019225096 A1 | * | 11/2019 | B60R 16/0215 |
| WO | WO-2020203738 A1 | * | 10/2020 | B60R 16/0207 |
| WO | WO-2020203742 A1 | * | 10/2020 | B60R 11/0205 |
| WO | WO-2020203757 A1 | * | 10/2020 | B60R 11/0205 |
| WO | WO-2020203758 A1 | * | 10/2020 | B60R 13/0815 |
| WO | WO-2021020122 A1 | * | 2/2021 | B60R 16/0215 |
| WO | WO-2021075165 A1 | * | 4/2021 | B60R 16/0207 |
| WO | WO-2021172343 A1 | * | 9/2021 | |
| WO | WO-2021187102 A1 | * | 9/2021 | B60R 16/0215 |
| WO | WO-2021192957 A1 | * | 9/2021 | B60R 16/0215 |
| WO | WO-2021210325 A1 | * | 10/2021 | B60R 16/0215 |
| WO | WO-2021220573 A1 | * | 11/2021 | |
| WO | WO-2022196546 A1 | * | 9/2022 | |
| WO | WO-2022209626 A1 | * | 10/2022 | |

OTHER PUBLICATIONS

U.S. Appl. No. 17/440,485, filed Sep. 17, 2021.
U.S. Appl. No. 17/441,027, filed Sep. 20, 2021.
U.S. Appl. No. 17/441,065, filed Sep. 20, 2021.

* cited by examiner

F I G. 8
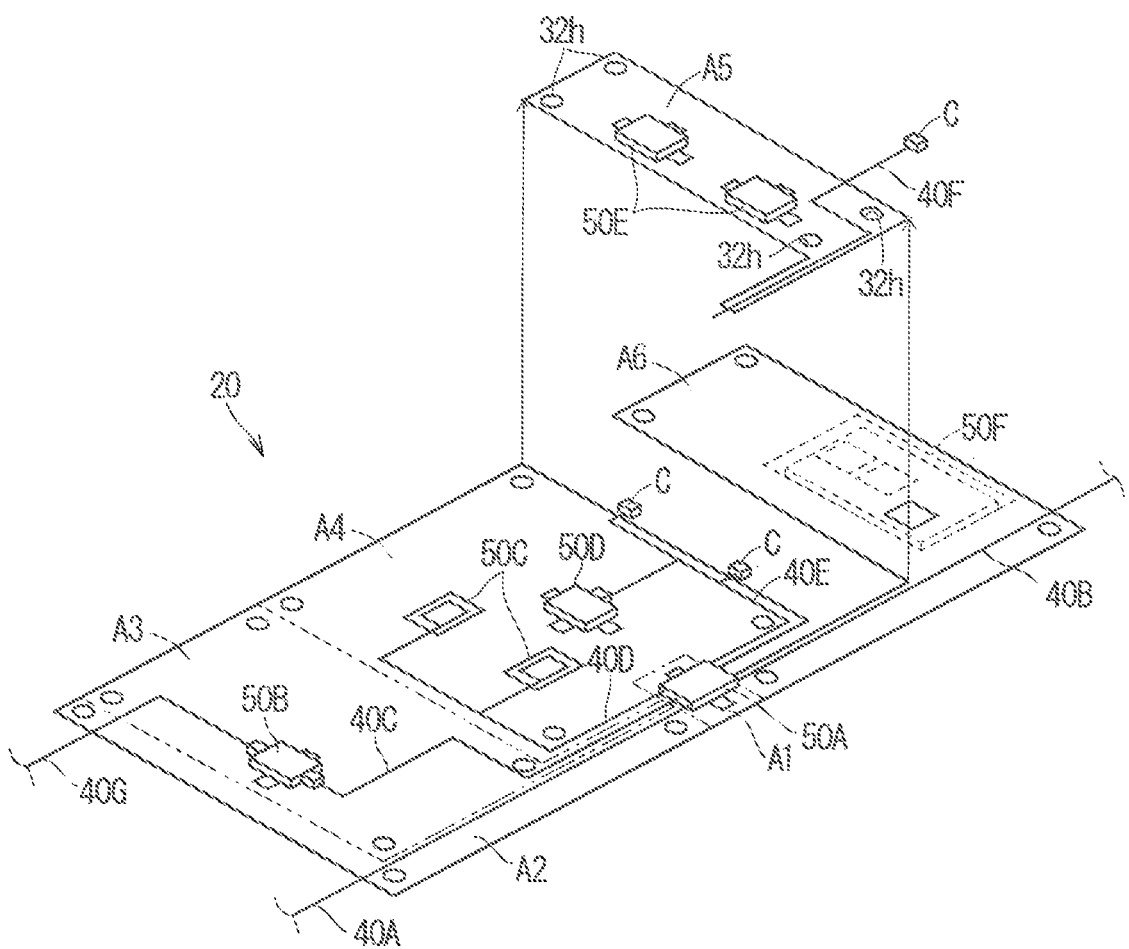

WIRING MODULE

TECHNICAL FIELD

The present disclosure relates to a wiring module.

BACKGROUND ART

Patent Document 1 discloses a wire harness assembly body assembled to a body of a vehicle. The wire harness assembly body includes a sheet-like acoustic insulation material, a sheet-like protection material stacked on the acoustic insulation material, and a wire harness having at least one electrical wire routed between the acoustic insulation material and the protection material.

Patent Document 2 discloses a laying structure of a wiring module including a panel member, a wiring module, and a panel peripheral component. The wiring module includes a sheet-like member and at least one electrical wire. The sheet-like member is laid on a main surface of the panel member. At least one electrical wire is fixed to the sheet-like member so that the sheet-like member is disposed along a predetermined wiring route in a state where the sheet-like member is laid on a main surface of the panel member. The panel peripheral component is provided in a constant position with respect to the panel member to position the wiring module on the panel member.

PRIOR ART DOCUMENTS

Patent Documents

Patent Document 1: Japanese Patent Application Laid-Open No. 2018-090229
Patent Document 2: Japanese Patent Application Laid-Open No. 2018-207625

SUMMARY

Problem to be Solved by the Invention

However, situations arise in which it is required to replace only a part of a module component in which an electrical wire is fixed to a sheet-like member such as a wire harness assembly body described in Patent Document 1 and a wiring module described in Patent Document 2.

Thus, an object of the disclosed invention is to be able to increase a repair property in a wiring module in which a transmission member is fixed to a sheet.

Means to Solve the Problem

A wiring module according to the present disclosure is a wiring module including: a sheet which is a member extending planarly and including an easy-fracture part sectioning the sheet into a plurality of areas and capable of dividing the sheet into the areas; and a transmission member including one of or both a power line supplying an electrical power to at least one apparatus provided in one or the plurality of areas and a signal line enabling communication with the apparatus, wherein in a case where the transmission member is disposed over at least two areas, a part of a middle portion of the transmission member in relation to an end portion connected to the apparatus is fixed to a first area in the two areas, and the transmission member is laid without being fixed to a second area in the two areas.

Effects of the Invention

According to the present disclosure, a repair property can be increased in a wiring module in which a transmission member is fixed to a sheet.

BRIEF DESCRIPTION OF DRAWINGS

FIG. 8 is an explanation view illustrating a state where the wiring module is repaired.

DESCRIPTION OF EMBODIMENT(S)

Description of Embodiment of Present Disclosure

Figure 1:
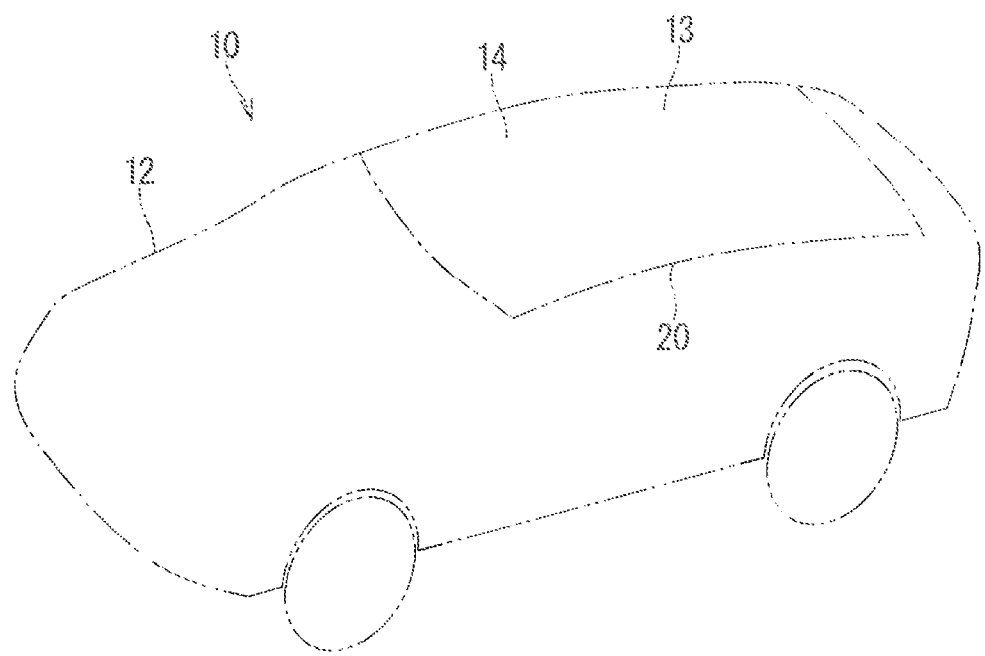
FIG. 1 is a schematic perspective view illustrating a vehicle into which a wiring module is incorporated.

Embodiments of the present disclosure are listed and described firstly.

A wiring module according to the present disclosure is as follows.

(1) A wiring module includes: a sheet which is a member extending planarly and including an easy-fracture part sectioning the sheet into a plurality of areas and capable of dividing the sheet into the areas; and a transmission member including one of or both a power line supplying an electrical power to at least one apparatus provided in one or the plurality of areas and a signal line enabling communication with the apparatus, wherein in a case where the transmission member is disposed over at least two areas, a part of a middle portion of the transmission member in relation to an end portion connected to the apparatus is fixed to a first area in the two areas, and the transmission member is laid without being fixed to a second area in the two areas. The sheet is fractured using the easy-fracture part, thereby being easily divided into each area. The wiring module includes the transmission member fixed to the first area and not fixed to the second area, thus the transmission member is easily replaced in each area. According to these configurations, a repair property can be increased in a wiring module in which a transmission member is fixed to a sheet.

(2) It is also applicable that the wiring module according to (1) further includes an electronic control unit provided on the sheet to control a power supply to or communication with the plurality of apparatus, wherein the transmission member is laid over the plurality of areas from a predetermined position where the electronic control unit is mounted on the sheet to a predetermined position where the apparatus is provided. Accordingly, a repair property of a wiring module in which an electronic control unit and an apparatus provided on a sheet are connected via a transmission member can be increased.

(3) In the wiring module according to (2), the sheet may be disposed between a roof panel forming a roof part of a vehicle and an interior member forming a ceiling shape of a vehicle interior. Accordingly, a repair property of a wiring module provided on a roof can be increased.

(4) In the wiring module according to (3), the sheet may be functional sheet as a member planarly extending over the roof panel and the interior member and including one or all of layers each having a heat insulation function, an acoustic insulation function, and a radio wave shielding function. Accordingly, a repair property of a wiring module in which a transmission member is fixed to a sheet can be increased.

(5) In the wiring module according to (3) or (4), the transmission member may be electrically connected to a wiring laid from a vehicle-side apparats and a power source mounted on a side of the vehicle to the roof part via a pillar. Accordingly, a repair property of a wiring module in which a transmission member connected to a wiring on a vehicle side is fixed to a sheet can be increased.

(6) In the wiring module according to (5), the electronic control unit may supply one of or both a power source and a signal supplied from the wiring to the at least one apparatus via the transmission member. Accordingly, one of or both a power source and a signal are supplied to an apparatus provided on a sheet via an electronic control unit and a transmission member.

(7) In the wiring module according to any one of (1) to (6), wherein a plurality of apparatuses executing an identical type of function may be provided in the one area. Accordingly, a plurality of apparatuses executing an identical type of function are disposed in the same area.

(8) In the wiring module according to any one of (1) to (6), wherein a plurality of apparatuses each executing a function different from each other may be provided in the one area. Accordingly, a plurality of apparatuses each executing a function different from each other are disposed in the same area.

Details of Embodiment of Present Disclosure

Specific examples of a wiring module of the present disclosure are described hereinafter with reference to the drawings. The present invention is not limited to these examples, but is indicated by claims, and it is intended that meanings equivalent to claims and all modifications within a scope of claims are included.

Embodiment

A wiring module according to embodiments is described hereinafter.

<Vehicle into which Wiring Module is Incorporated>

FIG. 1 is a schematic perspective view illustrating a vehicle 10 into which a wiring module 20 is incorporated. The vehicle 10 includes a body 12. The body 12 is a part forming an outline of the vehicle 10. The body 12 may be a monocoque body or a body mounted on a ladder type frame. Herein, the body 12 includes a boarding door panel for a passenger to get in or out of a vehicle and a rear door panel to take in and out a luggage, for example. The body 12 may be formed by metal or resin. The body 12 may also be made of a combination of metal and resin. A plate-like part of the body 12 covering an upper side of the vehicle interior constitutes the roof panel 13. The roof panel 13 may be partially or wholly curved to form an appearance shape of the body 12. The roof panel 13 may be formed by metal or resin. The roof panel 13 may also be made of a combination of metal and resin. Herein, an antenna hole 13h is formed in the roof panel 13 (refer to FIG. 2).

The wiring module 20 is incorporated into the vehicle 10. In the example described in the present embodiment, the wiring module 20 is incorporated into a roof 14 including the roof panel 13. The wiring module 20 may also be incorporated into the other member in the vehicle 10 such as a boarding door, a rear door, and an installment panel, for example.

Figure 2:
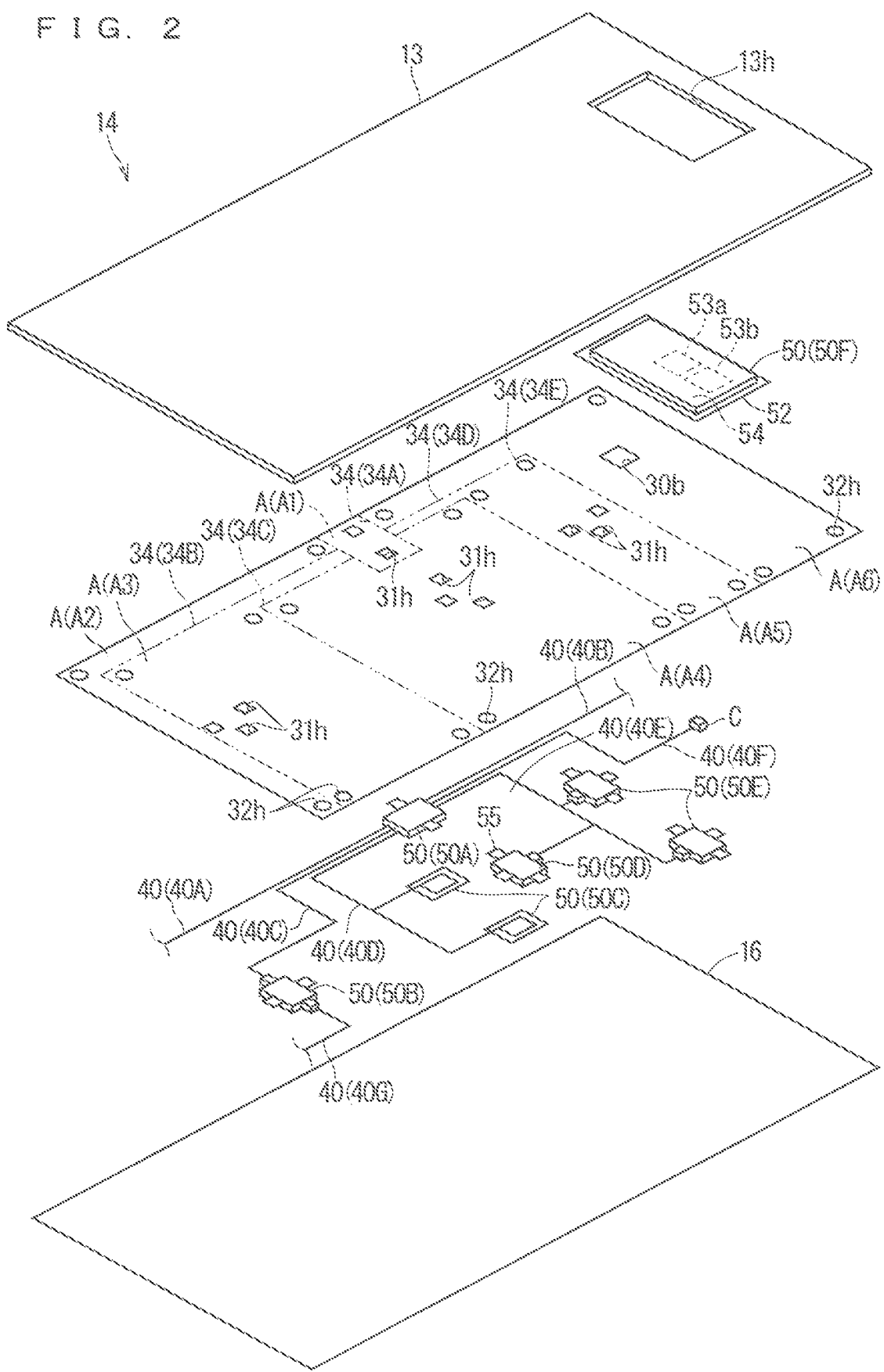
FIG. 2 is an exploded perspective view illustrating the wiring module.
Figure 3:
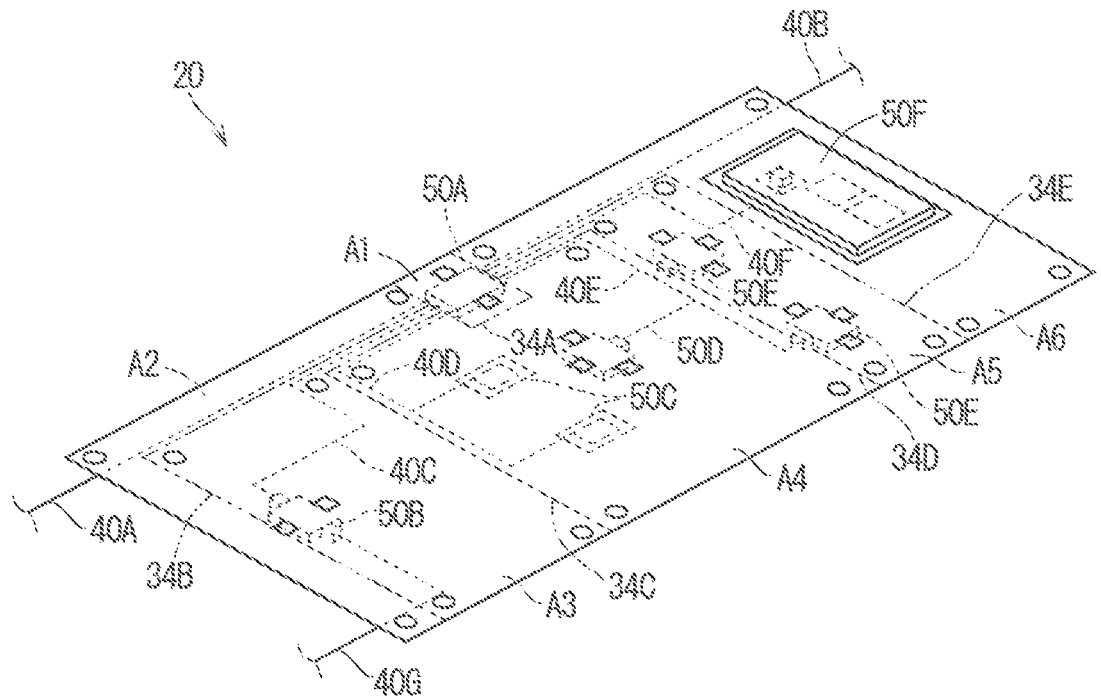
FIG. 3 is a perspective view illustrating the wiring module.
Figure 4:
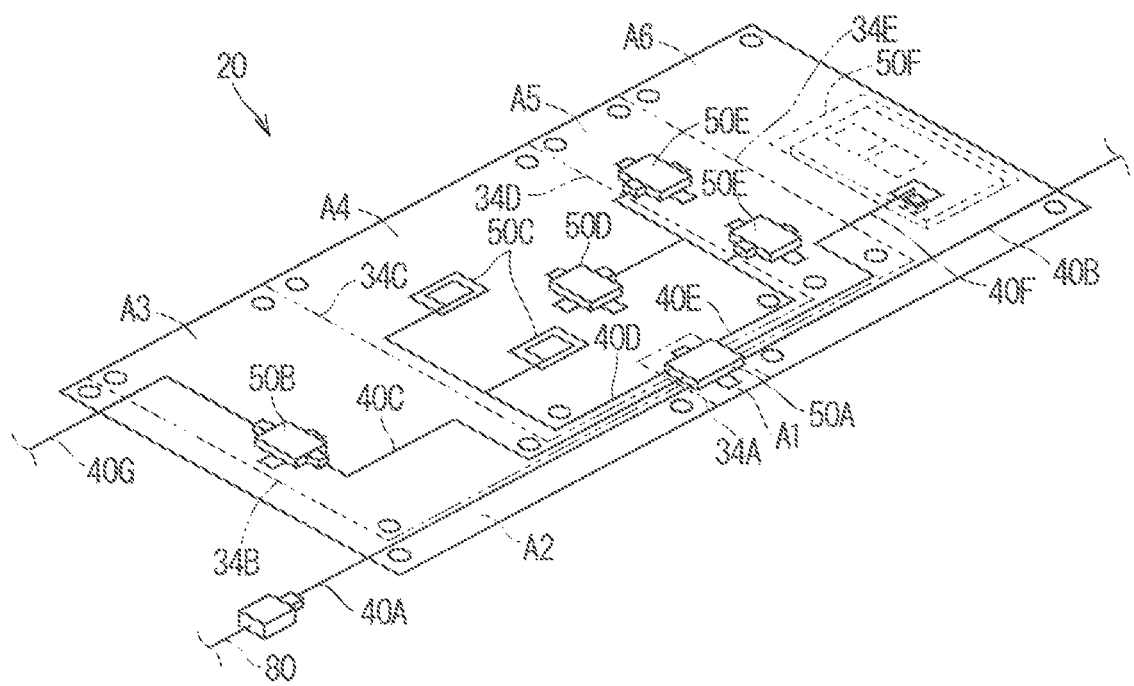
FIG. 4 is a perspective view illustrating the wiring module seen from a side opposite to FIG. 3.

FIG. 2 is an exploded perspective view illustrating the wiring module 20. FIG. 3 is a perspective view illustrating the wiring module 20. FIG. 4 is a perspective view illustrating the wiring module 20 seen from a side opposite to FIG. 3. FIG. 2 illustrates the roof 14 as the roof part of the vehicle. The roof panel 13 described above and an interior member 16 are illustrated as the roof 14. The interior member 16 is a plate-like member formed of resin, for example. The interior member 16 may be partially or wholly curved to form a ceiling shape of the vehicle interior. The interior member 16 is attached to a lower side of the roof panel 13. The interior member 16 is a part exposed to the vehicle interior. The interior member 16 is also referred to as a roof liner in some cases. In the present embodiment, the wiring module 20 is provided between the roof panel 13 and the interior member 16.

<Whole Structure of Wiring Module>

The wiring module 20 includes a sheet 30 and a wire-like transmission member 40. The wiring module 20 further includes an apparatus 50.

The sheet 30 is a sheet-like member to which the wire-like transmission member 40 is fixed. Herein, the apparatus 50 is also fixed to the sheet 30. The sheet 30 is incorporated into the roof 14 to planarly extend over the roof 14. For example, the sheet 30 may be disposed to cover 80% or more of an area of the roof 14. For example, the sheet 30 may be disposed to extend over a whole upper side of head rests of a plurality of passenger seats in the vehicle. The sheet 30 is disposed to extend over the roof 14, thus the wire-like transmission member 40 and the apparatus 50 can be fixed to the roof 14 in a region as large as possible.

The wire-like transmission member 40 is an example of a transmission member. The wire-like transmission member 40 is a wire-like member transmitting an electrical power or light, for example. For example, the wire-like transmission member may be a general wire having a core wire and a covering around the core wire, or may also be a bare conductive wire, a shielded wire, an electrical cable, an enamel wire, a nichrome wire, a coaxial wire, or an optical fiber. The wire-like transmission member transmitting the electrical power may be various kinds of signal lines or various kinds of power lines. The wire-like transmission member may be a single wire-like object or a composite object of a plurality of wire-like objects (a twisted wire and a cable made up of a plurality of wire-like objects covered by a sheath). The transmission member is not limited to the wire-like transmission member 40, but may be a circuit made by printing a conductive pattern on the sheet 30.

The wire-like transmission member 40 is fixed to the sheet 30. It is sufficient that the wire-like transmission member 40 is fixed along a constant route on the sheet 30, thus a specific configuration for fixation is not particularly limited.

For example, the wire-like transmission member 40 may be fixed to one main surface of the sheet 30. For example, the wire-like transmission member 40 may be welded (or fused) to one main surface of the sheet 30. A welding part thereby formed has a configuration that a part of at least one of the wire-like transmission member 40 and the sheet 30 is melted and adheres to the other side member. The wire-like transmission member 40 and the sheet 30 may be welded by ultrasonic welding or thermal welding. It is also applicable that a surface of at least one of the wire-like transmission member 40 and the sheet 30 is melted by a solvent to weld the wire-like transmission member 40 and the sheet 30. For example, the wire-like transmission member 40 may be fixed to the sheet 30 by an adhesive agent or a double-sided tape, for example. For example, the wire-like transmission member 40 may be sewn to the sheet 30 by a sewing thread, for example. It is also applicable that an adhesive tape is attached to a portion from a side of one main surface of the sheet 30 across the wire-like transmission member 40 in a state where the wire-like transmission member 40 is disposed on one main surface of the sheet 30 to fix the wire-like transmission member 40 to one main surface of the sheet 30, for example. The wire-like transmission member 40 needs not be fixed to only one main surface of the sheet 30. The wire-like transmission member 40 may include both a part fixed to one main surface of the sheet 30 and a part fixed to the other main surface of the sheet 30. In this case, the wire-like transmission member 40 may be provided to pass from one main surface toward the other main surface in a middle portion or an end edge portion of the sheet 30.

For example, the wire-like transmission member 40 may be sandwiched between two sheets, thereby being fixed to the sheet 30. For example, in a case where the sheet 30 includes a plurality of layers, the wire-like transmission member 40 may be sandwiched between sheets constituting each layer. In a case where the other sheet overlaps with the sheet 30, the wire-like transmission member 40 may be sandwiched between the sheet 30 and the other sheet. In this case, the two sheets sandwiching the wire-like transmission member 40 may be fixed by welding, or may also be fixed by an adhesive agent or a double-sided tape.

The wire-like transmission member 40 is connected to the apparatus 50. The apparatus 50 transmits or receives an electrical signal or an optical signal via the wire-like transmission member 40. Alternatively, the apparatus 50 receives a power supply or distributes electrical power via the wire-like transmission member 40. The wire-like transmission member 40 and the apparatus 50 may be connected to each other via a connector. It is also applicable that the wire-like transmission member 40 is directly introduced in the apparatus 50 to be directly connected to an electrical element in the apparatus 50.

The apparatus 50 is an apparatus disposed on the roof 14 to be a connection destination of the wire-like transmission member 40. Assumed as the apparatus 50 are, for example, an electronic control unit, a lamp (particularly, an interior lamp), a speaker, an interior camera, a monitor, a projection apparatus, an external communication antenna, and an interior-side antenna.

The apparatus 50 is fixed to the sheet 30. A position of fixing the apparatus 50 to the sheet 30 is optionally set. The apparatus 50 is preferably fixed to a position appropriate for a role of the apparatus 50 on the sheet 30. For example, assuming that the apparatus 50 is a map lamp, the apparatus 50 is fixed to a portion of the sheet 30 which is to be disposed in an obliquely upper front position of a front seat. For example, assuming that the apparatus 50 is an interior-side antenna, the apparatus 50 is fixed to a portion of the sheet 30 which is to be disposed in an upper position of a front seat or a rear seat.

In the description, the apparatus 50 located in a position closer to one side in a right-left direction and a center in a front-back direction of the sheet 30 is an electronic control unit (ECU) 50A (referred to as the ECU 50A hereinafter). In the description, the plurality of apparatuses arranged in the front-back direction in a position closer to the center in the right-left direction of the sheet 30 are an interior lamp 50B (referred to as the lamp 50B hereinafter), an interior-side antenna 50C (referred to as the antenna 50C hereinafter), an interior lamp 50D (referred to as the lamp 50D hereinafter), a monitor 50E, and an external communication antenna unit 50F (referred to as the antenna unit 50F hereinafter) arranged in this order from a side of a front part. In the description hereinafter, when the ECU 50A, the lamp 50B, the antenna 50C, the lamp 50D, the monitor 50E, and the antenna unit 50F need to be distinguished, reference signs 50A, 50B, 50C, 50D, 50E, and 50F are referenced, and when they need not be distinguished, they are collectively referred to as the apparatus 50 in some cases.

Figure 5:
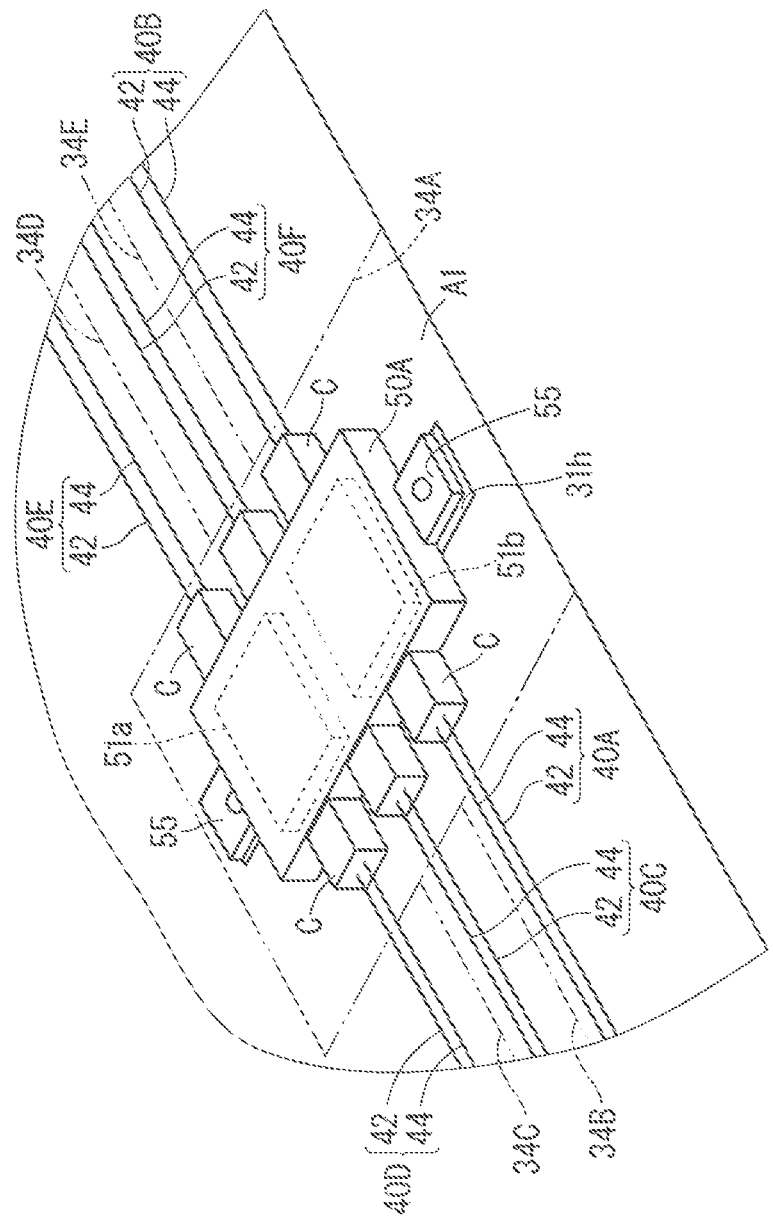
FIG. 5 is a perspective view illustrating an electronic control unit provided on the wiring module.

FIG. 5 is a perspective view illustrating the ECU 50A provided in the wiring module 20. The ECU 50A is an apparatus controlling each apparatus 50 mounted to the roof 14 while communicating with the other ECU provided in the vehicle 10. The ECU 50A includes a control circuit 51a. Accordingly, the ECU 50A controls each apparatus 50 connected to the ECU 50A. The ECU 50A includes a circuit 51b for power source distribution. Accordingly, the power source is supplied to each apparatus 50 connected to the ECU 50A.

The lamp 50B is a lamp for a front seat. The lamp 50D is a lamp for a rear seat. The monitor 50E is a monitor for a rear seat. The lamps 50B and 50D and the monitor 50E are apparatuses required to be exposed to the vehicle interior. In this case, it is sufficient that a hole is formed in the interior member 16. The lamps 50B and 50D and the monitor 50E are fitted into the hole, thereby being able to be exposed to the vehicle interior. An apparatus such as the ECU 50A which needs not be exposed to the vehicle interior may be housed between the interior member 16 and the roof panel 13.

The antenna 50C is an antenna for performing wireless communication with an interior apparatus (a smartphone, a mobile phone, and a personal computer device), for example, in a vehicle. For example, the antenna 50C is a WI-FI (registered trademark) communication antenna or a BLUETOOTH (registered trademark) communication antenna. The antenna 50C may be a non-contact power supply antenna performing a power supply to an interior apparatus in the vehicle in a non-contact form. A frequency for the non-contact power supply is optionally set. Applicable as the antenna 50C is a printed circuit antenna in which an antenna is formed on a substrate by a conductive foil, for example. The printed circuit may be flexible printed circuits (FPC). When the antenna 50C is made up as a printed circuit antenna, the antenna 50C is attached to the sheet 30 with a thin occupied space. When the printed circuit antenna is made up of the FPC, the occupied space is further thinned. A sheet-like antenna such as the FPC antenna can be easily deformed to follow a shape corresponding to a space where the antenna can be disposed. The antenna 50C may also be a rod antenna, for example. The two antennas 50C are provided herein, however, the number of antennas 50C may be one, or may also be three or more.

The antenna unit 50F includes external communication antennas 53a and 53b (referred to as the antennas 53a and 53b hereinafter) for performing wireless communication with an apparatus located on the outer side of the vehicle. Herein, the antenna unit 50F includes a base member 52, the antennas 53a and 53b, and the cover 54. The base member 52 is formed into a flat shape, that is, a rectangular plate-like shape herein. The antennas 53a and 53b are provided on the base member 52. The antennas 53a and 53b are antennas for performing communication with a vehicle external apparatus. The antennas 53a and 53b are antennas for performing communication with a wireless base station in a public communication line or a private communication line, antennas for vehicle-to-vehicle communication or road-vehicle communication, or antennas for receiving a GPS signal, for example. Herein, the plurality of antennas 53a and 53b are mounted on the base member 52. Accordingly, the plurality of antennas 53a and 53b are handled as one collected form. The antenna unit 50F may include only one antenna. The antenna unit 50F may include three or more antennas. The cover 54 is made up of resin, for example, and covers an upper side of the antennas 53a and 53b and four sides around the antennas 53a and 53b. The antenna hole 13h formed in the roof panel 13 is formed into a shape corresponding to an outer periphery of the cover 54. The cover 54 in the antenna unit 50F is fitted into the antenna hole 13h formed in the roof panel 13. Accordingly, even when the roof panel 13 is made of metal, the antennas 53a and 53b are not covered by metal, but can be directed outward.

<Route of Wire-Like Transmission Member in Sheet>

The plurality of wire-like transmission members 40 include a wire-like transmission member 40 disposed along a route from the ECU 50A toward a front side, a route from the ECU 50A toward a back side, and a plurality of routes from the ECU 50A toward each apparatus 50 on the sheet 30 connected to the ECU 50A. In FIG. 2 to FIG. 4, the wire-like transmission member 40 along each route is simplified, and illustrated as a single wire. In FIG. 5, the wire-like transmission member 40 along each route is illustrated as two wires. The number of wire-like transmission members 40 in each route is not particularly limited, but is appropriately set. In the route including the plurality of wire-like transmission members 40, the plurality of wire-like transmission members 40 are preferably fixed in a state of being arranged side by side on the sheet 30.

A wire-like transmission member 40A located along the route from the ECU 50A toward the front side is fixed to the sheet 30 in a region of the sheet 30, thereby being held along a constant route. The wire-like transmission member 40A extends from a front part of the sheet 30 to the outer side. The wire-like transmission member 40A is disposed along an A pillar in a vehicle, for example, and connected to the other vehicle-side apparatus such as an ECU and a power source in the vehicle. For example, the wire-like transmission member 40A may be connected to a wiring 80 disposed along an A pillar, for example, in a vehicle as illustrated in FIG. 4. The wiring 80 includes one or a plurality of wire-like transmission members. The plurality of wire-like transmission members may be bundled in the wiring 80. The wiring 80 is laid from the other vehicle-side apparatus such as an ECU and a power source to a roof part in a vehicle via a pillar. The wire-like transmission member 40A may be connected to the other vehicle-side apparatus such as an ECU and a power source in a vehicle via the wiring 80. Any connection form may be applied as a connection form of the wire-like transmission member 40A and the wiring 80. In the example illustrated in FIG. 4, the wire-like transmission member 40A and the other wiring 80 is connector-connected to each other. The wire-like transmission member 40A extends from the front part of the sheet 30 to the outer side on one lateral side of a vehicle in a right-left direction. The wire-like transmission member 40A extends from the front part of the sheet 30 to the outer side on one lateral side of a vehicle in a right-left direction.

A wire-like transmission member 40B located along the route from the ECU 50A toward a back side is fixed to the sheet 30 in a region of the sheet 30, thereby being held along a constant route. The wire-like transmission member 40B extends from a back part of the sheet 30 to the outer side. The wire-like transmission member 40B is disposed along a B pillar or a C pillar in a vehicle, for example, and connected to the other vehicle-side apparatus such as an ECU and a power source in the vehicle. For example, the wire-like transmission member 40B may be connected to the other wiring disposed along the B pillar or the C pillar, for example, in the vehicle in the manner similar to the wire-like transmission member 40A. The wire-like transmission member 40B may be connected to the other wiring to be connected to the other vehicle-side apparatus such as an ECU and a power source in a vehicle.

The wire-like transmission members 40C, 40D, 40E, and 40E located along a plurality of routes from the ECU 50A toward the plurality of apparatuses 50 connected to the ECU 50A are fixed to the sheet 30, thereby being held along a constant route. The wire-like transmission members 40C, 40D, 40E, and 40F are laid over a plurality of areas from a position where the ECU 40A is mounted to a position where the apparatus 50 to be connected is provided. The routes of the wire-like transmission members 40C, 40D, 40E, and 40F are set to pass through specific areas described hereinafter. It is preferable that the routes of the plurality of wire-like transmission members 40A, 40B, 40C, 40D, 40E, and 40F do not intersect with each other.

As illustrated in FIG. 5, the wire-like transmission member 40 in each route may include a signal line 42. The wire-like transmission member 40 in each route may include a power source line 44. The wire-like transmission member 40 in each route may include both or only one of the signal line 42 and the power source line 44. The number of signal lines 42 in each route may be one, or a plurality of signal lines 42 may also applicable, thus the number thereof is appropriately set in accordance with the number of connection destinations and a communication protocol, for example. When the communication protocol is a control area network (CAN), for example, a pair of apparatuses are normally connected by a twist pair wire made up of two twisted covering wires. When the communication protocol is a local interconnect network (LIN), for example, a pair of apparatuses are connected by one covering wire. The number of power source lines 44 in each route may be one, or a plurality of power source lines 44 may also applicable, thus the number thereof is appropriately set in accordance with the number of connection destinations, for example. The wire-like transmission member 40 in each route may include a ground wire. The ground wire may be omitted by a body earth.

In the example illustrated in FIG. 5, a control circuit 51a in the ECU 50A is connected to the other ECU in a vehicle via the signal line 42 in the wire-like transmission member 40A. A power source is supplied to a circuit 51b for power source distribution in the ECU 50A via the power source line 44 in the wire-like transmission member 40A. In the apparatus 50 connected to the ECU 50A by the wire-like transmission member 40, the signal line 42 in the wire-like transmission member 40 is connected to the control circuit 51a in the ECU 50A to control the apparatus 50. The power source line 44 in the wire-like transmission member 40 is connected to the circuit 51b for power source distribution in the ECU 50A to supply a power source to the apparatus 50.

Specifically, the signal line 42 in the wire-like transmission member 40C is connected to the control circuit 51a in the ECU 50A to control the lamp 50B, for example. The power source line 44 in the wire-like transmission member 40C is connected to the circuit 51b for power source distribution in the ECU 50A to supply a power source to the lamp 50B.

The wire-like transmission member 40 may be connected to the apparatus 50 which is not fixed to the sheet 30. For example, it is also applicable that the antenna unit 50F is not fixed to the sheet 30 but is fixed to the roof panel 13. In this case, the wire-like transmission member 40F fixed to the sheet 30 may be connected to the antenna unit 50F. For example, a connector C of the wire-like transmission member 40F may be connector-connected to the antenna unit 50F when the wiring module 20 is incorporated into the roof 14.

It is also applicable that in the wire-like transmission member 40, one end portion extends to the outer side of the sheet 30, and the other end portion is directly connected to the apparatus 50 without an intervention of the ECU 50A. For example, one end portion of a wire-like transmission member 40G extends from the front part of the sheet 30 to the outer side, and the other portion is connected to the lamp 50B. The wire-like transmission member 40G is fixed to the sheet 30 in a region of the sheet 30, thereby being held along a constant route. Alternatively, it is also applicable that in a wire-like transmission member, one end portion is connected to the antenna unit 50F and the other end portion extends to the outer side of the sheet 30 from the front part or the back part of the sheet 30 without the intervention of the ECU 50A, for example.

It is also applicable that in the wire-like transmission member 40, one end portion and the other end portion extend to the outer side of the sheet 30, and the middle portion is fixed to the sheet 30. Examples of such a wire-like transmission member include a wire-like transmission member extending in a front-back direction of a vehicle, for example.

<Area Dividing Structure in Sheet>

At least one easy-fracture part 34 linearly extending along the main surface of the sheet 30 is formed in the sheet 30. The sheet 30 is divided into a plurality of areas A by the easy-fracture part 34. The plurality of areas A are connected to each other in an initial state. When repair needs to be performed in an area A in the plurality of areas A, the easy-fracture part 34 sectioning the area A is fractured, that is to say, the sheet 30 is fractured at a position of the easy-fracture part 34, thus the area A is easily divided from the other areas A.

The easy-fracture part 34 extends from an edge of the sheet 30 or the other easy-fracture part 34. The easy-fracture part 34 extends toward an edge of the sheet 30 or the other easy-fracture part 34. The easy-fracture part 34 is not particularly limited as long as it enables the fracture of the sheet 30 easily, thus various configurations are applicable. For example, the easy-fracture part 34 may include a plurality of small holes formed intermittently. For example, the easy-fracture part 34 may include a groove formed to be concaved in a thickness direction. For example, the easy-fracture part 34 may include both a plurality of small holes and a groove. In FIG. 2 to FIG. 5, the easy-fracture part 34 is illustrated by a dashed-two dotted line to be distinguished from the other lines.

When the easy-fracture part 34 includes the plurality of small holes, a direction in which the plurality of small holes are intermittently arranged is an extension direction of the easy-fracture part 34. The plurality of small holes formed intermittently are also referred to as a perforated line, for example. An operator splits a portion between the plurality of small holes in the sheet 30 to connect the plurality of small holes, thereby being able to easily fracture the sheet 30.

When the easy-fracture part 34 includes the groove, a direction in which the groove extends along the main surface of the sheet 30 is an extension direction of the easy-fracture part 34. A horizontal section of the groove is not particularly limited, however, it is sufficient that the groove is formed so that a width dimension gradually decreases from an opening part in the main surface of the sheet 30 toward a bottom part to have a V-like shape, for example. The groove may be formed only in one of both main surfaces of the sheet 30, or may also be formed in both main surfaces thereof. The groove is formed, thus stress is easily concentrated. Accordingly, the operator can easily fracture the sheet 30 along the groove.

When the easy-fracture part 34 and a portion around the easy-fracture part 34 are relatively hard in the sheet 30, the sheet 30 is folded at the easy-fracture part 34, thereby being broken at the easy-fracture part 34. Accordingly, the sheet 30 is fractured at a position of the easy-fracture part 34. In this case, it can be considered that the easy-fracture part 34 and the portion around the easy-fracture part 34 have hardness of being able to be broken in the sheet 30.

When the easy-fracture part 34 and the portion around the easy-fracture part 34 are relatively soft such that they cannot be broken in the sheet 30, the sheet 30 is sequentially split from a certain position in the easy-fracture part 34 along an extension direction, thereby being fractured at the position of the easy-fracture part 34, for example. At this time, it is sufficient that a portion of the sheet 30 where the easy-fracture part 34 is formed has a hand-cutting property so that the operator can cut the position of the easy-fracture part 34 in the sheet 30 with a hand.

In the present embodiment, the five easy-fracture parts 34 are formed in the sheet 30. In the description hereinafter, when the five easy-fracture parts 34 need to be distinguished, reference signs 34A, 34B, 34C, 34D, and 34E are referenced, and when they need not be distinguished, they are collectively referred to as the easy-fracture part 34 in some cases. The easy-fracture part 34A extends on the sheet 30 in a right-left direction and a front-back direction from a first position along the front-back direction in one side edge portion of the sheet 30 in the right-left direction, and then extends to a second position along the front-back direction in one side edge portion thereof in the right-left direction. The easy-fracture parts 34B and 34C extend from the easy-fracture part 34A toward the front side of the sheet 30, and then extend to a lateral side at the front part of the sheet 30 to reach the other side edge portion of the sheet 30. The easy-fracture parts 34D and 34E extends from the easy-fracture part 34A toward the back side of the sheet 30, and then extend to the lateral side at the back part of the sheet 30 to reach the other side edge portion of the sheet 30. The easy-fracture part 34A has an U-like shape. Each of the easy-fracture parts 34B, 34C, 34D, and 34E has an L-like shape. The sheet 30 is divided into the six areas A by the five easy-fracture parts 34. In the description hereinafter, when the six areas A need to be distinguished, reference signs A1, A2, A3, A4, A5, and A6 are referenced, and when they need not be distinguished, they are collectively referred to as the area A in some cases.

The area A1 is an area to which the ECU 50A is fixed. The easy-fracture part 34A sections the area A1 from the other areas A. The easy-fracture part 34A extends along an area around the ECU 50A. End portions of the wire-like transmission members 40A, 40B, 40C, 40D, 40E, and 40F are connected to the ECU 50A, however, the wire-like transmission members 40A, 40B, 40C, 40D, 40E, and 40F are not directly fixed to the sheet 30 in the area A1. Thus, when the connection between the end portion of the wire-like transmission members 40A, 40B, 40C, 40D, 40E, and 40F and the ECU 50A is released, the wire-like transmission members 40A, 40B, 40C, 40D, 40E, and 40F are not fixed to the area A1.

The area A2 is an area including a side edge portion and a front edge portion of the roof 14. The easy-fracture parts 34A and 34B section the area A2 from the other areas A. The wire-like transmission members 40A and 40G are fixed to the sheet 30 in the area A2. The apparatus 50 is not fixed to the area A2.

The area A3 is an area located closer to a front part of the roof 14. The easy-fracture parts 34A, 34B, and 34C section the area A3 from the other areas A. The lamp 50B is fixed to the area A3. The wire-like transmission members 40C and 40G are fixed to the sheet 30 in the area A3.

The area A4 is an area located near a center of the roof 14. The easy-fracture parts 34A, 34C, and 34D section the area A4 from the other areas A. The antenna 50C and the lamp 50D are fixed to the area A4. The wire-like transmission members 40D and 40E are fixed to the sheet 30 in the area A4. The wire-like transmission member 40E is connected to a monitor 50E fixed the other area A5.

The area A5 is an area located closer to a back part of the roof 14. The easy-fracture parts 34A, 34D, and 34E section the area A5 from the other areas A. The monitor 50E is fixed to the area A5. A middle portion of the wire-like transmission member 40F is fixed in the area A5. The end portion of the wire-like transmission member 40F is connected to the antenna unit 50F fixed the other area A6. Specifically, a through hole 30b passing through front and back sides of the sheet 30 is formed in the area A6. The end portion of the wire-like transmission member 40F fixed to the vehicle interior side of the sheet 30 is passed through the through hole 30b and drawn to the surface on a vehicle exterior side of the sheet 30. The connector C in the end portion of the wire-like transmission member 40F is connected to the antenna unit 50F at an outer side of the surface on the vehicle exterior side of the sheet 30.

The area A6 is an area located in the back part of the roof 14. The easy-fracture parts 34A and 34E section the area A6 from the other areas A. The antenna unit 50F is fixed to the area A6. A middle portion of the wire-like transmission member 40B is fixed to the area A5. The wire-like transmission member 40B extends from the back part of the sheet 30 to the outer side. The middle portion of the wire-like transmission member 40F connected to the antenna unit 50F is not fixed to the area A6.

A plurality of fixing positions fixed to an attaching target are provided in each of the areas A2, A3, A4, A5, and A6. Herein, a plurality of attachment holes 43h are formed in each of the areas A2, A3, A4, A5, and A6. For example, a bolt is passed through the attachment hole 32h and fixed to the roof panel 13, thus each of the areas A2, A3, A4, A5, and A6 is fixed to the roof panel 13 at a position of the attachment hole 32h. For example, a clamp is inserted into the attachment hole 32h, and the clamp is inserted into a clamp hole formed in the roof panel 13 and locked thereto, thus each of the areas A2, A3, A4, A5, and A6 are fixed to the roof panel 13 at the position of the attachment hole 32h. A fixing member such as a clamp may be provided in a fixing position.

The sheet 30 includes the first area and the second area divided by at least one easy-fracture part 34. The plurality of wire-like transmission members 40 include a first wire-like transmission member and a second wire-like transmission member. The first wire-like transmission member is a wire-like transmission member held in the first area in a state where the sheet 30 is divided into the first area and the second area. The first wire-like transmission member is a wire-like transmission member in which a major part of a middle portion fixed on the sheet 30 is fixed to the first area in a state before the sheet 30 is divided into the first area and the second area. The second wire-like transmission member is a wire-like transmission member held in the second area in a state where the sheet 30 is divided into the first area and the second area. The second wire-like transmission member is a wire-like transmission member in which a major part of a middle portion fixed on the sheet 30 is fixed to the second area in a state before the sheet 30 is divided into the first area and the second area. The easy-fracture part 34 sectioning the first area and the easy-fracture part 34 sectioning the second area extend from the apparatus 50. In the present embodiment, two of the areas A2, A3, A4, A5, and A6 can optionally become the first area and the second area described above.

The case where the major part of the middle portion of the wire-like transmission member 40 is fixed to the sheet 30 indicates a case where the wire-like transmission member 40 is continuously fixed to the sheet 30 and a case where 70% or more of a total extension of the fixed part is fixed to the sheet 30, for example. The case where the major part of the middle portion of the wire-like transmission member 40 is fixed to the sheet 30 indicates a case where the wire-like transmission member 40 is intermittently fixed to the sheet 30 and a case where 70% or more of a total number of fixing positions are fixed to the sheet 30, for example.

It is sufficient that the middle portion of the first wire-like transmission member is fixed to only the first area in a state before the sheet 30 is divided into the first area and the second area. In this case, the middle portion of the wire-like transmission member 40 needs not be detached from the first area when the first area is fractured at the position of the easy-fracture part 34. It can be considered that there is no wire-like transmission member 40 in which the middle portion is fixed to the plurality of areas A. In the present embodiment, the areas A4 and A5 can become the first area described above. More specifically, the middle portion of the wire-like transmission members 40D and 40E fixed to the area A4 is fixed to only the area A4 in a state before the area A4 is divided from the other areas A. The middle portion of the wire-like transmission member 40F fixed to the area A5 is fixed to only the area A5 in a state before the area A5 is divided from the other areas A.

The first wire-like transmission member includes a first signal line connecting an apparatus and a first apparatus. The second wire-like transmission member includes a second signal line connecting an apparatus and a second apparatus. In the present embodiment, the wire-like transmission members 40C, 40D, 40E, and 40F can become the first and second wire-like transmission members described above. That is to say, the wire-like transmission members 40C, 40D, 40E, and 40F each connecting the ECU 50A and the apparatus 50 other than the ECU 50A include the signal line 42.

The first wire-like transmission member includes a first power source line connecting an apparatus and a first apparatus. The second wire-like transmission member includes a second power source line connecting an apparatus and a second apparatus. In the present embodiment, the wire-like transmission members 40C, 40D, 40E, and 40F can become the first and second wire-like transmission members described above. That is to say, the wire-like transmission members 40C, 40D, 40E, and 40F each connecting the ECU 50A and the apparatus 50 other than the ECU 50A include the power source line 44.

The wiring module 20 includes a plurality of identical function apparatuses achieving the same function. The easy-fracture part 34 divides the sheet 30 so that the plurality of identical function apparatuses are disposed in the same area in the first area and the second area. In the present embodiment, the plurality of antennas 50C are the identical function apparatuses, and are disposed in the same area A4 by the easy-fracture parts 34A, 34C, and 34D. In the present example, the plurality of monitors 50E are the identical function apparatuses, and are disposed in the same area A5 by the easy-fracture parts 34A, 34D, and 34E.

The wiring module 20 further includes the first function apparatus and the second function apparatus each achieving a function different from each other. The easy-fracture part 34 divides the sheet so that both the first function apparatus and the second function apparatus are disposed in the same area in the first area and the second area. In the present embodiment, the antenna 50C and the lamp 50D achieve different functions, and are disposed in the same area A4 by the easy-fracture parts 34A, 34C, and 34D.

When the wire-like transmission members 40 for the plurality of areas A are connected to the ECU 50A, it is sufficient that the wire-like transmission members 40 for the different areas A are connected to the ECU 50A via the different connectors C. In the present embodiment, the wire-like transmission members 40A, 40B, 40C, 40D, 40E, and 40F are connected to the ECU 50A via the different connectors C. Accordingly, when a specific area A is divided, the connector C corresponding to the divided area A is detached from the ECU 50A, thus the connection between the wire-like transmission member 40 corresponding to the divided area A and the ECU 50A can be easily released.

<Fixing Structure of Apparatus Fixed to Sheet>

An example of a fixing structure of the apparatus 50 fixed to the sheet 30 is described. The apparatus 50 may be directly fixed to the sheet 30. The apparatus 50 may be fixed to the sheet 30 via an apparatus holder. FIG. 5 illustrates an example that the apparatus 50 (the ECU 50A in the example illustrated in FIG. 5) is directly fixed to the sheet 30. The apparatus 50 is directly fixed to one main surface of the sheet 30. Herein, a state where the apparatus 50 is directly fixed to the sheet 30 indicates that the apparatus 50 is fixed without an intervention of the other fixation holder, for example.

For example, the apparatus 50 may be welded (or fused) to one main surface of the sheet 30. A welding part thereby formed has a configuration that a part of at least one of the apparatus 50 and the sheet 30 is melted and adheres to the other side member. The apparatus 50 and the sheet 30 may be welded by ultrasonic welding or thermal welding. It is also applicable that a surface of at least one of the apparatus 50 and the sheet 30 is melted by a solvent to weld the apparatus 50 and the sheet 30. For example, the apparatus 50 may be fixed to the sheet 30 by an adhesive agent or a double-sided tape, for example. For example, the apparatus 50 may be sewn to the sheet 30 by a sewing thread, for example. For example, a protrusion piece for sewing may be formed outside the apparatus 50. It is sufficient that a hole is formed in die protrusion piece. The apparatus 50 is sewn to the sheet 30 using this hole. It is also applicable that the sheet 30 is sandwiched between the apparatus 50 and a fixation plate to fix the apparatus 50 to the sheet 30. For example, the apparatus 50 is disposed on a side of one main surface of the sheet 30, and a plate-like fixation plate is disposed on a side of the other main surface of the sheet 30. In this state, a screw passing through the sheet 30 secures the apparatus 50 and the fixation plate in an approaching direction. Accordingly, the sheet 30 is sandwiched between the apparatus 50 and the fixation plate.

The apparatus 50 may be fixed to any of one main surface and the other main surface of the sheet 30. In FIG. 5, the apparatus 50 is fixed to a surface on a lower side (a vehicle interior side) of the sheet 30. The apparatus 50 is formed into a rectangular parallelepiped shape, for example. The apparatus 50 is directly fixed to the surface on the lower side of the sheet 30 in a state where one main surface thereof has contact with the surface on the lower side of the sheet 30.

Herein, a fixing piece 55 for fixation to the roof 14 is provided to protrude from the apparatus 50. A screw insertion hole for screw fixation is formed in the fixing piece 55. An opening 31h is formed in a position in the sheet 30 corresponding to the fixing piece 55. Thus, the fixing piece 55 can be overlapped with a side of a lower surface of the roof panel 13 in a state where the wiring module 20 is disposed between the roof panel 13 and the interior member 16. Accordingly, the fixing piece 55 can be easily fixed to the roof panel 13 with a screw. For example, the fixing piece 55 can be fixed to a reinforcement bar (also referred to as a stay or a beam) in the roof panel 13 with a screw.

In the present embodiment, the lamps 50B and 50D, the antenna 50C, the monitor 50E, and the antenna unit 50F which are examples of the apparatus 50 are also directly fixed to the sheet 30 in the manner similar to that descried above. The apparatus 50 directly fixed to the sheet 30 may be referred to as a direct fixation apparatus.

Figure 6:
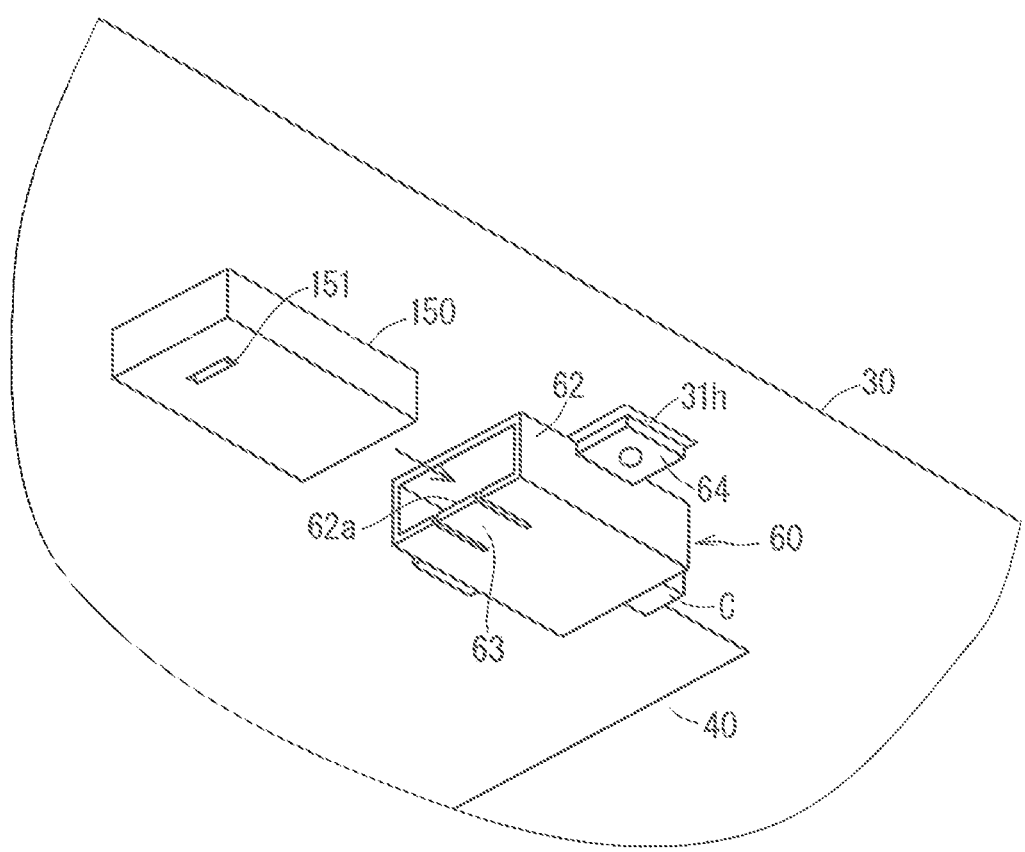
FIG. 6 is a perspective view illustrating an apparatus and an apparatus holder.
Figure 7:
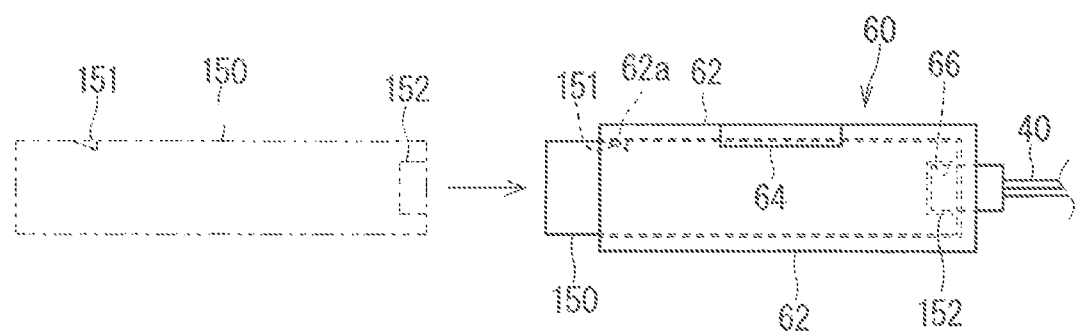
FIG. 7 is a side view illustrating an apparatus and an apparatus holder.

FIG. 6 is a perspective view illustrating a state where an apparatus 150 is fixed to the sheet 30 via an apparatus holder 60. FIG. 7 is a side view illustrating the apparatus 150 and the apparatus holder 60.

The apparatus holder 60 is configured to be able to hold the apparatus 150 in a state of being fixed to the sheet 30. Herein, the apparatus holder 60 includes a holder body part 62 and a fixing piece 64.

The holder body part 62 is formed into a rectangular parallelepiped box-like shape with an opening on one end side by resin, for example. The holder body part 62 is directly fixed to one main surface of the sheet 30 in the manner similar to the direct fixation apparatus described above. A space capable of partially or wholly housing the apparatus 150 is formed inside the holder body part 62. Herein, the apparatus 150 is formed into a rectangular parallelepiped shape. A rectangular parallelepiped space corresponding to an outer shape of the apparatus 150 is formed inside the holder body part 62.

A locking piece 63 which can be locked to the apparatus 150 is formed in the holder body part 62. Herein, an elongated groove-like concave part 151 is formed on an outer periphery of the apparatus 150. The locking piece 63 is formed in a part of an opening part of the holder body part 62. Both side parts of the locking piece 63 are separated from the other part of the holder body part 62. Accordingly, the locking piece 63 can be elastically deformed in an inward-outward direction of the holder body part 62 at a base end part thereof as a support position. A convex part 62a protruding toward an inner side of the holder body part 62 is formed on a tip part of the locking piece 63. When the apparatus 150 is inserted into the holder body part 62, the convex part 62*a* has contact with an outer surface of the apparatus 150, and the locking piece 63 is elastically deformed outward. When the apparatus 150 is inserted into a back side of the holder body part 62 so that the convex part 62*a* reaches the concave part 151, the locking piece 63 is elastically recovered to an original shape, and the convex part 62*a* is fitted into the concave part 151. Accordingly, the apparatus 150 is held in the holder body part 62 in a state of not coming out thereof. The holder body part 62 needs not necessarily have a locking structure by the locking piece 63. For example, the apparatus 150 may be held in the holder body part 62 by holding strength in connecting a connector. The apparatus 150 may be fixed to the holder body part 62 with a screw, for example.

A holder-side connector 66 is provided in the holder body part 62. The holder-side connector 66 is provided on the back side of the holder body part 62. The holder-side connector 66 is exposed to an outer side and an inner side of the holder body part 62. The wire-like transmission member 40 is introduced in the holder-side connector 66 from an outward part of the holder-side connector 66. In the holder-side connector 66, the wire-like transmission member 40 is connected to a terminal located in the holder-side connector 66. The terminal in the holder-side connector 66 is exposed in the holder body part 62.

An apparatus-side connector 152 which can be connected to the holder-side connector 66 is provided in a part of the apparatus 150 inserted into the back side of the holder body part 62. As described above, when the apparatus 150 is inserted into the holder body part 62, the apparatus-side connector 152 and the holder-side connector 66 are connected to each other.

The fixing piece 64 is provided to protrude from the holder body part 62. The fixing piece 64 has a configuration similar to the fixing piece 55 provided in the direct fixation apparatus. An opening 31*h* is formed in a position in the sheet 30 corresponding to the fixing piece 64. Thus, the fixing piece 64 can be overlapped with a side of a lower surface of the roof panel 13 in a state where the wiring module 20 is disposed between the roof panel 13 and the interior member 16. Accordingly, the fixing piece 64 can be easily fixed to the roof panel 13 with a screw. An indirect fixation apparatus itself may also be fixed to the roof panel 13, for example, in a configuration using the holder.

The apparatus 150 fixed to the sheet 30 via the apparatus holder 60 may be referred to as an indirect fixation apparatus. When the indirect fixation apparatus such as the apparatus 150 is adopted in the wiring module 20, the apparatus 150 can be easily detached from the wiring module 20, and a repair property can be increased.

In the wiring module 20, a configuration of directly attaching the apparatus 50 to the sheet 30 and a configuration of attaching the apparatus 150 to the sheet 30 via the apparatus holder 160 may be combined. For example, the antenna 50C is formed into the sheet-like shape, thus may be directly fixed to the sheet 30 without an intervention of the apparatus holder 60.

It is preferable that the apparatus 50 and the apparatus holder 60 are finally fixed to the roof panel 13 or the interior member 16, for example. Thus, it is sufficient that the apparatus 50 and the apparatus holder 60 are fixed to the sheet 30 at an intensity large enough to be able to keep a constant position on the sheet 30 in a state before being fixed to the roof panel 13, for example.

<Method of Repairing Wiring Module>

Figure 9:
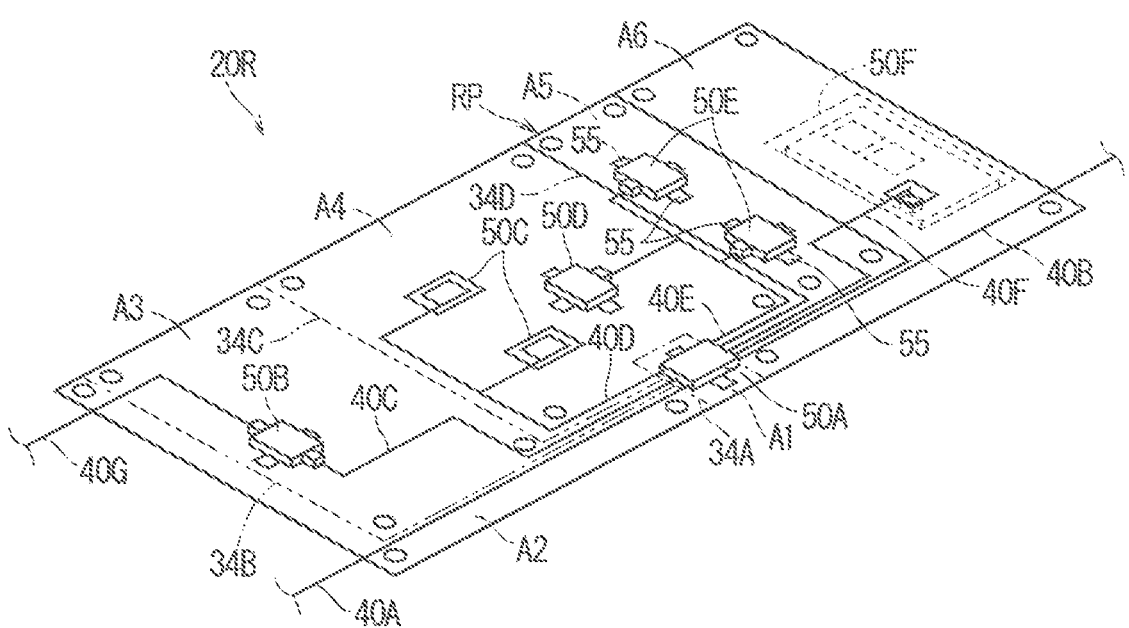
FIG. 9 is a perspective view illustrating the repaired wiring module.

A method of repairing the wiring module 20 is described with reference to FIG. 8 and FIG. 9. FIG. 8 is an explanation view illustrating a state where the wiring module 20 is repaired. FIG. 9 is a perspective view illustrating a wiring module 20R which has been repaired. As illustrated in FIG. 8 and FIG. 9, an example of repairing the area A5 is described herein.

Firstly, the easy-fracture parts 34A, 34C, and 34D sectioning the area A5 are fractured. The easy-fracture parts 34C and 34D section the area A4 over the entire length. Such an easy-fracture part 34 is fractured over the entire length. Only a part of the easy-fracture part 34A along the extension direction sections the area A5. Such an easy-fracture part 34 needs not be fractured over the entire length, however, it is sufficient that only a part thereof sectioning the area A5 is fractured.

Next, the area A5 in the sheet 30 and the wire-like transmission member 40F fixed to the area A5 are detached from the wiring module 20 and the vehicle (the roof panel 13). With regard to the detachment of the area A5, a part of the sheet 30 constituting the area A5 is fixed to the vehicle with a bolt, for example, at a position of the attachment hole 32*h*, thus this fixation is detached. With regard to the detachment of the wire-like transmission member 40F, the end portion of the wire-like transmission member 40F is connected to the ECU 50A and the antenna unit 50F which are not fixed to the area A5, thus the connection state is released. For example, the connector C provided in the end portion of the wire-like transmission member 40F is detached from the ECU 50A, thus the connection state of the wire-like transmission member 40F and the ECU 50A is released. In the similar manner, the connector C provided in the end portion of the wire-like transmission member 40F is detached from the antenna unit 50F, thus the connection state of the wire-like transmission member 40F and the antenna unit 50F is released. A middle portion of the wire-like transmission member 40F is not directly fixed to the sheet 30 in the area A other than the area A5. Thus, when the area A5 is detached from the wiring module 20 and the vehicle, the wire-like transmission member 40F can be detached together only by releasing the connection state of the end portion and the apparatus in the wire-like transmission member 40F.

Herein, the monitor 50E fixed to the area A5 is also detached from the wiring module 20 and the vehicle. With regard to the detachment of the monitor 50E fixed to the area A5, an end portion of the wire-like transmission member 40E which is not fixed to the area A5 is connected to the monitor 50E fixed to the area A5, thus the connection state is released. For example, the connector C provided in the end portion of the wire-like transmission member 40E is detached from the monitor 50E, thus the connection state of the wire-like transmission member 40E and the monitor 50E is released. The fixation of the monitor 50E and the roof panel 13 by the fixing piece 55 is released. A middle portion of the wire-like transmission member 40E is not directly fixed to the sheet 30 in the area A5. Thus, when the area A5 is detached from the wiring module 20, the detachment of the wire-like transmission member 40E together is suppressed only by releasing the connection state of the end portion of the wire-like transmission member 40E.

Next, the wire-like transmission member 40F and the monitor 50E, for example, fixed to the area A5 are repaired. A portion of the sheet 30, the wire-like transmission member 40F, and the monitor 50E in the area A5 are reused if they can be reused, and are replaced if they cannot be reused. The portion of the sheet 30, the wire-like transmission member 40F, and the monitor 50E in the area A5 on which repair (including maintenance) is completed are each referred to as a repaired component RP regardless of whether each of them is a reused component or a replaced component. A route of the middle portion of the wire-like transmission member 40F in the repaired component RP may be the same as or different from that in a state where before the component is repaired. A fixing state of the wire-like transmission member 40F and the sheet 30 in the repaired component RP may be the same as or different from that in a state where before the component is repaired. A fixing state of the monitor 50E and the sheet 30 in the repaired component RP may be the same as or different from that in a state where before the component is repaired.

Next, the area A5 and the repaired component RP of the wire-like transmission member 40F are attached to the wiring module 20 and the vehicle. In attaching the area A5, the portion of the sheet 30 in the area A5 is fixed to the vehicle using the attachment hole 32h. In attaching the wire-like transmission member 40F, the area A5 is disposed in a predetermined position in the vehicle, thus the wire-like transmission member 40F fixed to the area A5 is disposed to follow a predetermined route. In this state, the end portion of the wire-like transmission member 40F is located near the ECU 50A and the antenna unit 50F which are not fixed the area A5. Subsequently, the end portion of the wire-like transmission member 40F is connected to the ECU 50A and the antenna unit 50F. For example, the connectors C provided in the end portions of the wire-like transmission member 40F are connected to the ECU 50A and the antenna unit 50F, respectively, thus the wire-like transmission member 40F is connected to the ECU 50A and the antenna unit 50F.

Herein, the repaired component RP includes the monitor 50E fixed to the area A5. Thus, the attachment of the repaired component RP to the wiring module 20 and the vehicle includes the attachment of the monitor 50E. In attaching the monitor 50E fixed to the area A5, the area A5 is disposed in a predetermined position, thus the monitor 50E is also disposed in a predetermined position. The fixing piece 55 is located near a predetermined fixing position in a state where the monitor 50E is disposed in a predetermined position. Subsequently, the monitor 50E and the vehicle are fixed by the fixing piece 55. The end portion of the wire-like transmission member 40E which is not fixed to the area A5 is connected to the monitor 50E fixed the area A5. The connector C provided in the end portion of the wire-like transmission member 40E is located near the monitor 50E in a state where the monitor 50E is disposed in a predetermined position. Subsequently, the connector C provided in the end portion of the wire-like transmission member 40E is connected to the monitor 50E, thus the wire-like transmission member 40E and the monitor 50E are connected to each other.

The repair of the portion corresponding to the area A5 is then finished in the wiring module 20. The other area A can be repaired in the manner similar to the case of the area A5 also in a case where the other area A needs to be repaired. A region across the plurality of adjacent areas A may be repaired at the same time. In this case, the easy-fracture part 34 sectioning the adjacent areas may not be fractured.

In the wiring module 20R on which the repair is completed, the easy-fracture part 34 is partially omitted compared with the wiring module 20 which has not been repaired. The area A relating to the repaired component RP is located independently of the other areas A.

Effect Etc. of Embodiments

According to the wiring module 20 having such a configuration, the sheet 30 is fractured using the easy-fracture part 34, thereby being easily divided into each area A. When the sheet 30 is divided into each area, a predetermined wire-like transmission member 40 is held in each area, thus the replacement is easily performed in each area A. Accordingly, a repair property can be increased in the wiring module 20 in which the wire-like transmission member 40 is fixed to the sheet 30. In repairing the wiring module 20, a portion relating to some areas A is repaired, thus the wiring module 20 needs not be wholly replaced, thus cost for replacement can be reduced.

The middle portions of the wire-like transmission members 40D and 40E are fixed to only the area A4 in a state before the area A4 is divided from the other area A. Thus, when the area A4 is divided, the middle portions of the wire-like transmission members 40D and 40E need not be detached from the other area A. Thus, the area A4 can be easily detached. A damage hardly occurs in a portion of the other area A in the sheet 30. The same applies to the area A5.

The easy-fracture parts 34B, 34C, 34D, and 34E sectioning the areas A2, A3, A4, A5, and A6 extend from a position where the ECU 50A is disposed (herein, the easy-fracture part 34A sectioning the area A1 where the ECU 50A is disposed). Thus, the area can be defined based on the ECU 50A. Accordingly, the route of the wire-like transmission member 40 associated with the plurality of areas A can be easily designed.

Each of the wire-like transmission members 40C, 40D, 50E, and 50F includes the signal line 42 connecting the ECU 50A and the apparatus 50 connected to the ECU 50A. Thus, the signal line 42 is divided into each area based on the ECU 50A. Each of the wire-like transmission members 40C, 40D, 40E, and 40F includes the power source line 44 connecting the ECU 50A and the apparatus 50 connected to the ECU 50A. Thus, the power source line 44 is divided into each area based on the ECU 50A. The wire-like transmission members 40C, 40D, 40E, and 40F are laid over a plurality of areas from a position where the ECU 50A is located to a position where the apparatus 50 is located. Accordingly, a repair property of the wiring module 20 in which the ECU 40A and the apparatus 50 provided on the sheet 30 are connected via the wire-like transmission members 40C, 40D, 40E, and 40F.

The easy-fracture parts 34A, 34C, and 34D section the sheet 30 so that the plurality of antennas 50C achieving the same function are disposed in the same area A4. The easy-fracture parts 34A, 34D, and 34E section the sheet 30 so that the plurality of monitors 50E achieving the same function are disposed in the same area A5. Thus, the identical function apparatuses can be disposed in the same area A.

The easy-fracture parts 34A, 34C, and 34D section the sheet 30 so that the antenna 50C and the lamp 50D each achieving a function different from each other are disposed in the same area A4, thus a relatively large range can be defined as one area.

The plurality of attachment holes 32h for the fixation to the attaching target are provided in each area A. Thus, a plurality of positions in one area A can be fixed to the vehicle. Accordingly, the replaced area A is stabilized.

The roof 14 is a member extending relatively widely in the vehicle 10. A repairing property can be increased in the wiring module 20 for the roof 14 extending relatively widely, thus the wiring module 20 needs not be wholly replaced, and cost for replacement can be reduced.

Modification Example

In the embodiment descried above, the easy-fracture part 34 is provided based on the ECU 50A having a power source distribution function and a control function, however, this configuration is not necessary. An apparatus having only the power source distribution function (for example, an electrical power junction box) may be applied as a base apparatus in place of the ECU 50A. A communication relay device (for example, a switching hub) may be applied as a base apparatus in place of the ECU 50A. A power source communication relay device having a power source distribution function and a communication relay function may be applied as a base apparatus in place of the ECU 50A. There may also be a case where the ECU 50A does not have a power source distribution function but has a control function.

The sheet 30 may have one or a plurality of functions other than the function of fixing the wire-like transmission member 40 and the apparatus 50. Examples of the other function include a heat insulation function, an acoustic insulation function, and a radio wave shielding function. When the sheet has the plurality of other functions, one layer may have the plurality of functions, or different layers may be provided for each function. The plurality of layers may simply overlap with each other. The plurality of layers may be fixed to each other by a double-sided tape, an adhesive agent, or welding, for example.

The heat insulating layer is a layer suppressing a heat transmission between one main surface and the other main surface of the sheet 30. The heat insulating layer may be a layer reflecting heat radiation energy. The heat insulating layer may be a layer having lower heat conductivity than the other layer. Specifically, a sheet including minute spaces such as a non-woven sheet or a foam sheet, for example, may be used as the heat insulating layer. A heat insulating coating or a heat shielding coating may be used as the heat insulating layer.

The acoustic insulation layer is a layer suppressing a sound transmission between one main surface and the other main surface of the sheet 30. The acoustic insulation layer may reflect sound or absorb energy of sound as heat energy. Specifically, a sheet including minute spaces such as a non-woven sheet or a foam sheet, for example, may be used as the acoustic insulation layer. A sound absorbing coating may be used as the acoustic insulation layer.

The radio wave shielding layer is a layer suppressing a radio wave transmission between one main surface and the other main surface of the sheet 30. The radio wave shielding layer may have a radio wave shielding property on all of frequencies. The radio wave shielding layer may have a selective radio wave shielding property on some frequency band. In this case, it is sufficient that at least one of reflection and absorption of radio wave of some frequency band is performed in the radio wave shielding layer. The radio wave shielding layer may be a layer formed of metal such as aluminum or iron. A known frequency selective surface (FSS) may be used as the radio wave shielding layer having the selective radio wave shielding property. The frequency selective surface has a configuration that a unit cell (element) is formed by a metal foil on a base film formed of resin, for example. Such a frequency selective surface has characteristics of selectively shielding radio wave of one or a plurality of frequency bands in accordance with frequency characteristics of the unit cell (cell), and passing radio wave of the other frequency band. The radio wave shielding layer having the selective radio wave shielding property may also be formed by directly printing a conductive paste on a heat insulating layer or an acoustic insulation layer, for example. In this case, the heat insulating layer or the acoustic insulation layer is a layer doing double duty as the radio wave shielding layer described above.

When the frequency band of the radio wave radiated by the antenna 50C is included in the frequency band shielded by the frequency selective surface, the radio wave is shielded by the frequency selective surface. When a frequency band of any radio wave radiated by the antennas 53a and 53b is included in the frequency band shielded by the frequency selective surface, any radio wave radiated by the antennas 53a and 53b is shielded by the frequency selective surface. When a frequency band of any radio wave radiated by the antennas 53a and 53b is out of range of the frequency band shielded by the frequency selective surface, the radio wave for external communication passes through the frequency selective surface.

In the embodiment, the antenna unit 50F is formed into a thin box-like shape, however, this configuration is not necessary. The antenna unit 50F may be formed into a fin-like shape or a rod-like shape. In this case, the antenna unit formed into the fin-like shape or the rod-like shape may be inserted into a hole formed in the roof panel to protrude to an outer side of the roof panel. The antennas 53a and 53b are preferably incorporated into a fin-like or rod-like antenna unit to be located outside the roof panel.

Each configuration described in the embodiments and modification examples thereof can be appropriately combined as long as they are not contradictory.

The present disclosure includes a wiring module described hereinafter.

(1) A wiring module includes: a sheet and a plurality of wire-like transmission members fixed to the sheet, wherein at least one easy-fracture part linearly extending along a main surface is formed in the sheet, the sheet includes a first and a second area divided at the at least one easy-fracture part, and the plurality of wire-like transmission members include a first wire-like transmission member held in the first area and a second wire-like transmission member held in the second area in a state where the sheet is divided into the first area and the second area. The sheet is fractured using the easy-fracture part, thereby being easily divided into each area. The first wire-like transmission member is mainly fixed to the first area, and the second wire-like transmission member is mainly fixed to the second area, thus the replacement is performed easily for each area. A repair property can be increased in the wiring module in which the wire-like transmission member is fixed to the sheet.

(2) In the wiring module according to (1), a middle portion of the first wire-like transmission member may be fixed to only the first area in a state before the sheet is divided into the first area and the second area. Accordingly, when the first area is divided from the other area, the middle portion of the first wire-like transmission member needs not be detached from the other area. Thus, the first area can be easily detached. A damage hardly occurs in a portion of the other area in the sheet.

(3) It is applicable that the wiring module according to (1) or (2) further includes an apparatus disposed on the sheet, and the easy-fracture part sectioning the first area and the easy-fracture part sectioning the second area may extend from a position where the apparatus is disposed. Accordingly, the area can be defined based on the apparatus. The route of the wire-like transmission member associated with the plurality of areas can be easily designed.

(4) In the wiring module according to (3), the first wire-like transmission member may include a first signal line connecting the apparatus and a first apparatus, and the second wire-like transmission member may include a second signal line connecting the apparatus and a second apparatus. Accordingly, the signal line is divided into each area based on the apparatus.

(5) In the wiring module according to (3) or (4), the first wire-like transmission member may include a first power source line connecting the apparatus and a first apparatus, and the second wire-like transmission member may include a second power source line connecting the apparatus and a second apparatus. Accordingly, the power source line is divided into each area based on the apparatus.

(6) It is applicable that the wiring module according to any one of (1) to (5) includes a plurality of identical function apparatuses achieving the same function, and the easy-fracture part may section the sheet so that the plurality of identical function apparatuses are disposed in the same area in the first area and the second area. Accordingly, the identical function apparatuses are disposed in the same area.

(7) It is applicable that the wiring module according to any one of (1) to (6) further includes a first function apparatus and a second function apparatus each achieving a function different from each other, and the easy-fracture part sections the sheet so that both the first function apparatus and the second function apparatus are disposed in the same area in the first area and the second area. Accordingly, a relatively large range can be defined as one area.

(8) In the wiring module according to any one of (1) to (7), wherein a plurality of fixing positions may be provided in each of the first area and the second area. Accordingly, the plurality of positions in one area can be fixed to the vehicle, thus the replaced area is stabilized.

(9) In the wiring module according to any one of (1) to (8), wherein the sheet may be a sheet incorporated into a roof. A repairing property can be increased in the wiring module for the roof extending relatively widely, thus the wiring module needs not be wholly replaced, thus cost for replacement can be reduced.

(10) A method of repairing a wiring module according to the present disclosure is a method of repairing the wiring module according to any one of (1) to (9) including: fracturing the easy-fracture part sectioning the first area; detaching the first area and the first wire-like transmission member from the wiring module and a vehicle; and attaching a repaired component of the first area and the first wire-like transmission member to the wiring module and the vehicle. The wiring module needs not be wholly replaced, thus cost for replacement can be reduced.

Explanation of Reference Signs 10 vehicle
12 body
13 roof panel
13h antenna hole
14 roof
16 interior member
20, 20R wiring module
30 sheet
30b through hole
31b opening
32h attachment hole
34, 34A, 34B, 34C, 34D, 34E easy-fracture part
40, 40A, 40B, 40C, 40D, 40E, 40F, 40G wire-like transmission member
42 signal line
44 power source line
50 apparatus
50A electronic control unit
50B interior lamp
50C interior-side antenna
50D interior lamp
50E monitor
50F external communication antenna unit
51a control circuit
51b circuit for power source distribution
52 base member
53a, 53b external communication antenna
54 cover
55 fixing piece
60 apparatus holder
62 holder body part
62a convex part
63 locking piece
64 fixing piece
66 holder-side connector
80 wiring
150 apparatus
151 concave part
152 apparatus-side connector
A, A1, A2, A3, A4, A5, A6 area
C connector
RP repaired component

The invention claimed is:

1. A wiring module, comprising:
a sheet which is a member extending planarly and including an easy-fracture part sectioning the sheet into a plurality of areas and capable of dividing the sheet into the plurality of areas;
a transmission member including one of or both a power line supplying an electrical power to at least one apparatus provided in one or more of the plurality of areas and a signal line enabling communication with the at least one apparatus; and
an electronic control unit provided on the sheet to control a power supply to or communication with the at least one apparatus, wherein
the transmission member is disposed over at least two areas of the plurality of areas,
a part of a middle portion of the transmission member, in relation to an end portion connected to the at least one apparatus, is fixed to a first area in the at least two areas of the plurality of areas, and
the transmission member is connected by a connector to the electronic control unit in a second area in the at least two areas of the plurality of areas without being fixed to the second area in the at least two areas of the plurality of areas.

2. The wiring module according to claim 1, wherein
the transmission member is laid over the plurality of areas from a predetermined position where the electronic control unit is mounted on the sheet to an other predetermined position where the at least one apparatus is provided.

3. The wiring module according to claim 2, wherein
the sheet is disposed between a roof panel forming a roof part of a vehicle and an interior member forming a ceiling shape of a vehicle interior.

4. The wiring module according to claim 3, wherein
the sheet is a functional sheet as a member planarly extending over the roof panel and the interior member and including one or all of layers of the sheet, each having a heat insulation function, an acoustic insulation function, and a radio wave shielding function.

5. The wiring module according to claim 3, wherein
the transmission member is electrically connected to an electrical wiring laid from a vehicle-side apparatus and a power source mounted on a side of the vehicle to the roof part via a pillar.

6. The wiring module according to claim 5, wherein
the electronic control unit supplies one of or both the power source and a signal supplied from the electric wiring to the at least one apparatus via the transmission member.

7. The wiring module according to claim 1, wherein
a plurality of apparatuses executing an identical type of function are provided in the one area.

8. The wiring module according to claim 1, wherein
a plurality of apparatuses each executing a function different from each other are provided in the one area.

* * * * *